(12) United States Patent
Chan

(10) Patent No.: US 12,432,176 B2
(45) Date of Patent: *Sep. 30, 2025

(54) QUARANTINE FOR CLOUD-BASED SERVICES

(71) Applicant: ServiceNow, Inc., Santa Clara, CA (US)

(72) Inventor: Antony Chan, Pasadena, CA (US)

(73) Assignee: ServiceNow Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/297,962

(22) Filed: Apr. 10, 2023

(65) Prior Publication Data
US 2023/0254279 A1 Aug. 10, 2023

Related U.S. Application Data

(63) Continuation of application No. 17/113,825, filed on Dec. 7, 2020, now Pat. No. 11,652,790.
(Continued)

(51) Int. Cl.
*H04L 9/40* (2022.01)
*G06F 8/65* (2018.01)
(Continued)

(52) U.S. Cl.
CPC ............ *H04L 63/0209* (2013.01); *G06F 8/65* (2013.01); *H04L 41/082* (2013.01); *H04L 41/28* (2013.01);
(Continued)

(58) Field of Classification Search
CPC . H04L 63/0209; H04L 63/0281; H04L 63/10; H04L 63/0218; H04L 67/75; H04L 67/10; H04L 41/082; H04L 41/4128; H04L 67/01; H04L 67/12; H04L 63/20; H04L 67/34; H04L 63/08; H04L 67/02; H04L 63/28; G06F 8/65
(Continued)

(56) References Cited

U.S. PATENT DOCUMENTS 6,321,229 B1 11/2001 Goldman
6,609,122 B1 8/2003 Ensor
(Continued)

*Primary Examiner* — Ranodhi Serrao
(74) *Attorney, Agent, or Firm* — FLETCHER YODER, PC

(57) ABSTRACT

A quarantine system could be disposed between an outer firewall and an inner firewall. The quarantine system may include persistent storage containing mappings between computing devices disposed within the inner firewall and data sources disposed outside the outer firewall. The quarantine system may include one or more processors configured to perform operations that include requesting and receiving, based on the mappings, a software-related update from a data source, the software-related update being targeted for deployment on the computing devices. The operations may also include assigning the software-related update for review by a group of one or more agents authorized to approve or reject the software-related update. The operations may also receiving an indication that the software-related update has been approved by the one or more agents and, responsive to receiving the indication, transmitting, based on the mappings, the software-related update to a recipient device within the inner firewall.

20 Claims, 10 Drawing Sheets

Related U.S. Application Data

(60) Provisional application No. 62/944,656, filed on Dec. 6, 2019.

(51) Int. Cl.
| | |
|---|---|
| *H04L 41/082* | (2022.01) |
| *H04L 41/28* | (2022.01) |
| *H04L 41/40* | (2022.01) |
| *H04L 67/10* | (2022.01) |
| *H04L 67/75* | (2022.01) |
| *H04L 41/0895* | (2022.01) |
| *H04L 41/12* | (2022.01) |

(52) U.S. Cl.
CPC .............. *H04L 63/10* (2013.01); *H04L 67/10* (2013.01); *H04L 67/75* (2022.05); *H04L 41/0895* (2022.05); *H04L 41/12* (2013.01); *H04L 41/40* (2022.05); *H04L 63/0281* (2013.01)

(58) Field of Classification Search
USPC .......................................................... 726/11
See application file for complete search history.

(56) References Cited

U.S. PATENT DOCUMENTS

| | | | |
|---|---|---|---|
| 6,990,660 B2* | 1/2006 | Moshir ................... G06F 8/65 | |
| | | | 717/176 |
| 7,020,706 B2 | 3/2006 | Cates | |
| 7,028,301 B2 | 4/2006 | Ding | |
| 7,058,970 B2* | 6/2006 | Shaw .................. H04L 63/0272 | |
| | | | 709/225 |
| 7,062,683 B2 | 6/2006 | Warpenburg | |
| 7,131,037 B1 | 10/2006 | LeFaive | |
| 7,170,864 B2 | 1/2007 | Matharu | |
| 7,174,564 B1* | 2/2007 | Weatherspoon ........ H04L 63/08 | |
| | | | 709/225 |
| 7,415,432 B1* | 8/2008 | Gianakouros .......... G06Q 40/06 | |
| | | | 705/37 |
| 7,480,936 B2* | 1/2009 | Lyon ..................... H04L 63/029 | |
| | | | 713/153 |
| 7,610,512 B2 | 10/2009 | Gerber | |
| 7,617,073 B2 | 11/2009 | Trinon | |
| 7,653,200 B2* | 1/2010 | Karmi ................. H04L 12/5692 | |
| | | | 380/272 |
| 7,689,628 B2 | 3/2010 | Garg | |
| 7,716,353 B2 | 5/2010 | Golovinsky | |
| 7,716,662 B2 | 5/2010 | Seiden | |
| 7,752,466 B2 | 7/2010 | Ginter | |
| 7,769,718 B2 | 8/2010 | Murley | |
| 7,783,744 B2 | 8/2010 | Garg | |
| 7,890,802 B2 | 2/2011 | Gerber | |
| 7,925,981 B2 | 4/2011 | Pourheidari | |
| 7,930,396 B2 | 4/2011 | Trinon | |
| 7,945,860 B2 | 5/2011 | Vambenepe | |
| 7,966,398 B2 | 6/2011 | Wiles | |
| 8,051,164 B2 | 11/2011 | Peuter | |
| 8,151,261 B2 | 4/2012 | Sirota | |
| 8,224,683 B2 | 7/2012 | Manos | |
| 8,266,096 B2 | 9/2012 | Navarrete | |
| 8,402,127 B2 | 3/2013 | Solin | |
| 8,457,928 B2 | 6/2013 | Dang | |
| 8,478,569 B2 | 7/2013 | Scarpelli | |
| 8,612,408 B2 | 12/2013 | Trinon | |
| 8,646,093 B2 | 2/2014 | Myers | |
| 8,674,992 B2 | 3/2014 | Poston | |
| 8,689,241 B2 | 4/2014 | Naik | |
| 8,743,121 B2 | 6/2014 | De Peuter | |
| 8,832,652 B2 | 9/2014 | Mueller | |
| 8,887,133 B2 | 11/2014 | Behnia | |
| 8,893,009 B2 | 11/2014 | Raleigh | |
| 8,997,091 B1 | 3/2015 | Watson | |
| 9,065,783 B2 | 6/2015 | Ding | |
| 9,098,322 B2 | 8/2015 | Apte | |
| 9,110,756 B1 | 8/2015 | Guo | |
| 9,122,552 B2 | 9/2015 | Whitney | |
| 9,213,836 B2* | 12/2015 | Mayer ..................... G06F 21/56 | |
| 9,239,857 B2 | 1/2016 | Trinon | |
| 9,317,327 B2 | 4/2016 | Apte | |
| 9,363,252 B2 | 6/2016 | Meuller | |
| 9,384,491 B1 | 7/2016 | Briggs | |
| 9,529,512 B2 | 12/2016 | Luckett, Jr | |
| 9,535,737 B2 | 1/2017 | Joy | |
| 9,645,833 B2 | 5/2017 | Mueller | |
| 9,654,473 B2 | 5/2017 | Miller | |
| 9,766,935 B2 | 9/2017 | Kelkar | |
| 9,792,387 B2 | 10/2017 | George | |
| 9,805,322 B2 | 10/2017 | Kelkar | |
| 9,843,624 B1* | 12/2017 | Taaghol ............. H04L 41/0895 | |
| 10,042,618 B1 | 8/2018 | Hulbert | |
| 10,152,314 B2 | 12/2018 | Borthakur | |
| 10,452,440 B1 | 10/2019 | Odulinski | |
| 10,453,011 B1 | 10/2019 | Briggs | |
| 10,484,334 B1* | 11/2019 | Lee ........................ H04L 67/30 | |
| 10,521,223 B1 | 12/2019 | Bogushefsky, III | |
| 10,552,137 B2 | 2/2020 | Zmijewski | |
| 10,623,245 B2* | 4/2020 | Narasimhan .......... H04L 51/046 | |
| 10,684,890 B2 | 6/2020 | Sparapani | |
| 10,700,927 B2* | 6/2020 | Narasimhan ........... H04L 67/02 | |
| 10,733,087 B2 | 8/2020 | Wiener | |
| 10,771,327 B2* | 9/2020 | Bendre ................... H04L 41/12 | |
| 10,826,723 B1 | 11/2020 | Strauss | |
| 11,099,818 B2 | 8/2021 | Bojara | |
| 11,153,394 B1 | 10/2021 | Eberlein | |
| 11,245,715 B2 | 2/2022 | Weingarten | |
| 11,349,958 B1 | 5/2022 | Kiselev | |
| 11,533,307 B2 | 12/2022 | Mahajan | |
| 11,704,431 B2* | 7/2023 | Kraus ................. H04L 63/0414 | |
| | | | 726/26 |
| 2002/0194287 A1 | 12/2002 | Tyra | |
| 2003/0163728 A1* | 8/2003 | Shaw .................. H04L 63/0272 | |
| | | | 726/12 |
| 2003/0191669 A1* | 10/2003 | Fitzgerald .............. G16H 70/20 | |
| | | | 707/999.1 |
| 2004/0025052 A1 | 2/2004 | Dickenson | |
| 2004/0185842 A1* | 9/2004 | Spaur ..................... B60R 25/33 | |
| | | | 455/410 |
| 2004/0205233 A1* | 10/2004 | Dunk ..................... H04L 67/563 | |
| | | | 709/217 |
| 2005/0114864 A1* | 5/2005 | Surace ....................... G06F 8/65 | |
| | | | 719/310 |
| 2005/0124288 A1* | 6/2005 | Karmi ................... H04W 12/06 | |
| | | | 455/3.01 |
| 2005/0177637 A1* | 8/2005 | Heron ................... H04L 63/029 | |
| | | | 709/227 |
| 2006/0036725 A1 | 2/2006 | Chand | |
| 2007/0208719 A1 | 9/2007 | Tran | |
| 2007/0283002 A1 | 12/2007 | Bornhoevd | |
| 2008/0047016 A1* | 2/2008 | Spoonamore .......... G06Q 10/06 | |
| | | | 726/25 |
| 2008/0162729 A1 | 7/2008 | Ruppert | |
| 2008/0205655 A1 | 8/2008 | Wilkins | |
| 2008/0255890 A1* | 10/2008 | Hilliard ............... G06Q 20/045 | |
| | | | 705/26.1 |
| 2009/0119500 A1 | 5/2009 | Roth | |
| 2010/0195503 A1 | 8/2010 | Raleigh | |
| 2010/0217837 A1 | 8/2010 | Ansari | |
| 2010/0281455 A1 | 11/2010 | Anand | |
| 2011/0314145 A1 | 12/2011 | Raleigh | |
| 2012/0265744 A1 | 10/2012 | Berkowitz | |
| 2013/0262626 A1 | 10/2013 | Bozek | |
| 2013/0312092 A1 | 11/2013 | Parker | |
| 2014/0033752 A1 | 2/2014 | Raleigh | |
| 2015/0074259 A1 | 3/2015 | Ansari | |
| 2015/0365351 A1 | 12/2015 | Suit | |
| 2016/0055215 A1 | 2/2016 | Kauwe | |
| 2016/0139902 A1 | 5/2016 | Dimitrakos | |
| 2016/0189544 A1 | 6/2016 | Ricci | |
| 2016/0196132 A1 | 7/2016 | Searle | |
| 2016/0291959 A1 | 10/2016 | Searle | |
| 2016/0294605 A1 | 10/2016 | Searle | |

(56) References Cited

U.S. PATENT DOCUMENTS

| | | |
|---|---|---|
| 2016/0294614 A1 | 10/2016 | Searle |
| 2016/0337206 A1 | 11/2016 | Bugenhagen |
| 2016/0378450 A1 | 12/2016 | Fu |
| 2017/0026301 A1 | 1/2017 | Keller |
| 2018/0060540 A1 | 3/2018 | Caruso |
| 2018/0227174 A1* | 8/2018 | Narasimhan ............ H04L 67/02 |
| 2018/0278722 A1 | 9/2018 | Jow |
| 2018/0343238 A1 | 11/2018 | Tola |
| 2018/0375841 A1 | 12/2018 | Tola |
| 2019/0104155 A1* | 4/2019 | DiCorpo ................. H04L 63/20 |
| 2019/0342162 A1* | 11/2019 | Bendre .................. H04L 63/08 |
| 2020/0073782 A1 | 3/2020 | Phoenix |
| 2020/0204438 A1* | 6/2020 | Narasimhan .......... H04L 67/125 |
| 2020/0249936 A1* | 8/2020 | Barfield, Jr. .............. G06F 8/60 |
| 2020/0257513 A1 | 8/2020 | Schroeder |
| 2020/0314191 A1* | 10/2020 | Madhavan .......... H04L 41/0853 |
| 2020/0412694 A1 | 12/2020 | Vanderveen |
| 2021/0011688 A1 | 1/2021 | Sasidharan |
| 2021/0168142 A1 | 6/2021 | Foxhoven |
| 2021/0367944 A1 | 11/2021 | Gupta |
| 2022/0075667 A1 | 3/2022 | Pany |
| 2022/0222125 A1* | 7/2022 | Vergara ..................... G06F 8/60 |
| 2023/0108524 A1* | 4/2023 | Mahajan ............... G06F 9/5077 |
| | | 717/177 |

* cited by examiner

QUARANTINE FOR CLOUD-BASED SERVICES

CROSS-REFERENCE TO RELATED APPLICATIONS

The present application is a continuation of U.S. patent application Ser. No. 17/113,825, filed on Dec. 7, 2020 and entitled "Quarantine for Cloud-Based Services"; which claims priority to U.S. Provisional Patent Application No. 62/944,656, filed on Dec. 6, 2019, entitled "Quarantine for Cloud-Based Services," the contents of which are entirely incorporated by reference herein.

BACKGROUND

To expand its operations, a remote network management platform may host its services on one or more computing resources (e.g., databases, virtual machines, software applications, and/or other resources) provided by a cloud network. Because the cloud network supplies the hardware and much of the software necessary to operate these computing resources, the remote network management platform may not have to devote time to provision or deploy its own infrastructure to host the services and instead can focus on building new services for its users or upgrading existing services.

SUMMARY

Although a cloud network generally provides the hardware and much of the software to operate its computing resources, from time to time a remote network management platform may wish to install updates to its software on the computing resources of the cloud network. For example, a computing resource may be running DEBIAN® LINUX® version 10.1.1, but the remote network management platform may wish to install DEBIAN® LINUX® version 10.1.2.

While it may be advantageous to utilize the functionality provided by these software updates, occasionally the updates contain harmful features that could negatively affect the cloud network. To prevent these harmful updates, a firewall could be used. For instance, when a user external to the cloud network deploys a software update (e.g., a PUPPET® Manifest, a CENTOS® Package, a firmware update, etc.) to a computing resource operating within the cloud network, the firewall could detect and responsively reject the software update before it reaches the computing resource.

Yet, not all software updates are harmful. Thus, to discern between beneficial software updates and deleterious software updates, an administrator of the cloud network could assign a qualified agent to assess the risk level of a given software update as it enters the cloud network. To perform such a risk assessment, the qualified agent could utilize a computing device equipped with a graphical interface that allows the agent to view the content of the software update and evaluate computing resources on the cloud network that may be affected by the update. The qualified agent could then use these details as a basis to approve or reject the update. For example, if the qualified agent considers the software update to be potentially harmful, the agent could reject the update. Otherwise, the agent could approve the update and allow it to deploy onto one or more computing resources operating within the cloud network.

As an additional security measure, the administrator may require that the qualified agent only perform risk assessments using computing devices that operate within the cloud network. Since these computing devices possess security features already put in place by the cloud network (e.g., security groups, authentication mechanisms, etc.), this extra requirement makes it more likely that the risk assessments made by the qualified agent will not be tampered with or otherwise altered, for instance by a man in the middle (MITM) attack or other type of attack.

While the process above may prevent dangerous software updates from affecting the cloud network, it also makes it unduly time consuming and burdensome to deploy beneficial software updates onto the cloud network. For example, if a user external to the cloud network, such an application developer or network engineer from the remote network management platform, wishes to deploy a software update to a computing resource within the cloud network, the user would first transmit the update to a qualified agent operating within the cloud network, who then would evaluate and manually approve the update. Consequently, when hundreds of users and thousands of software updates are involved, this process becomes extremely complicated and convoluted. The qualified agents may be inundated with update requests from external users and may be unable to identify which software update requests correspond to which computing resources on the cloud network. This could result in a large backlog of requests that prevents critical software updates from reaching computing resources on the cloud network.

To address this and potentially other issues, the embodiments herein provide for a quarantine system that quickly and efficiently pushes software updates to computing resources operating within the cloud network. The quarantine system could be part of a virtual local area network (VLAN) that operates within the cloud network. But unlike the other computing resources within the cloud network, this system is permitted pull software updates from locations external to the cloud network and store the updates into a "quarantine zone" located within the cloud network. The quarantine system could assign qualified agents to evaluate the software updates stored within the quarantine zone. If an agent approves a software update, the quarantine system can then push the update to a software repository or destination computing resource on the cloud network. Advantageously, the described quarantine system reduces the likelihood of harmful software updates being installed on the cloud network while simultaneously allowing beneficial software updates to be quickly installed therein. Other benefits are also possible.

Accordingly, a first example embodiment may involve a quarantine system disposed between an outer firewall and an inner firewall, where the inner firewall is disposed within the outer firewall. The quarantine system may include persistent storage containing mappings between computing devices disposed within the inner firewall and data sources disposed outside the outer firewall. These data sources may contain software-related updates for the computing devices. The quarantine system may also include one or more processors configured to perform operations. The operations may include requesting and receiving, based on the mappings, a particular software-related update from a particular data source of the data sources, where the particular software-related update is targeted for deployment on one or more particular computing devices of the computing devices. The operations may also include assigning the particular software-related update for review by a group of one or more agents authorized to approve or reject the particular software-related update, where the one or more agents can access information regarding the particular software-related update by way of the quarantine system. The operations may further include receiving an indication that the particular software-related update has been approved by the one or more agents. The operations may further include responsive to receiving the indication, transmitting, based on the mappings, the particular software-related update to a recipient device within the inner firewall.

In a second example embodiments, a computer-implemented method may include requesting and receiving, by a quarantine system and based on mappings between computing devices disposed within an inner firewall and data sources disposed outside an outer firewall, a particular software-related update from a particular data source of the data sources. The particular software-related update may be targeted for deployment on one or more particular computing devices of the computing devices and data sources may contain software-related updates for the computing devices. Further, the mappings may be contained in a persistent storage disposed in the quarantine system. Further, the quarantine system may be disposed between the outer firewall and the inner firewall and the inner firewall may be disposed within the outer firewall. The computer-implemented method may also include assigning, by the quarantine system, the particular software-related update for review by a group of one or more agents authorized to approve or reject the particular software-related update, where the one or more agents can access information regarding the particular software-related update by way of the quarantine system. The computer-implemented method may further include receiving, at the quarantine system, an indication that the particular software-related update has been approved by the one or more agents. The computer-implemented method may further include responsive to receiving the indication, transmitting, by the quarantine system and based on the mappings, the particular software-related update to a recipient device within the inner firewall.

In a third example embodiment, an article of manufacture may include a non-transitory computer-readable medium, having stored thereon program instructions that, upon execution by a computing system, cause the computing system to perform operations in accordance with the first example embodiment.

In a fourth example embodiment, a computing system may include at least one processor, as well as memory and program instructions. The program instructions may be stored in the memory, and upon execution by the at least one processor, cause the computing system to perform operations in accordance with the first example embodiment.

In a fifth example embodiment, a system may include various means for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
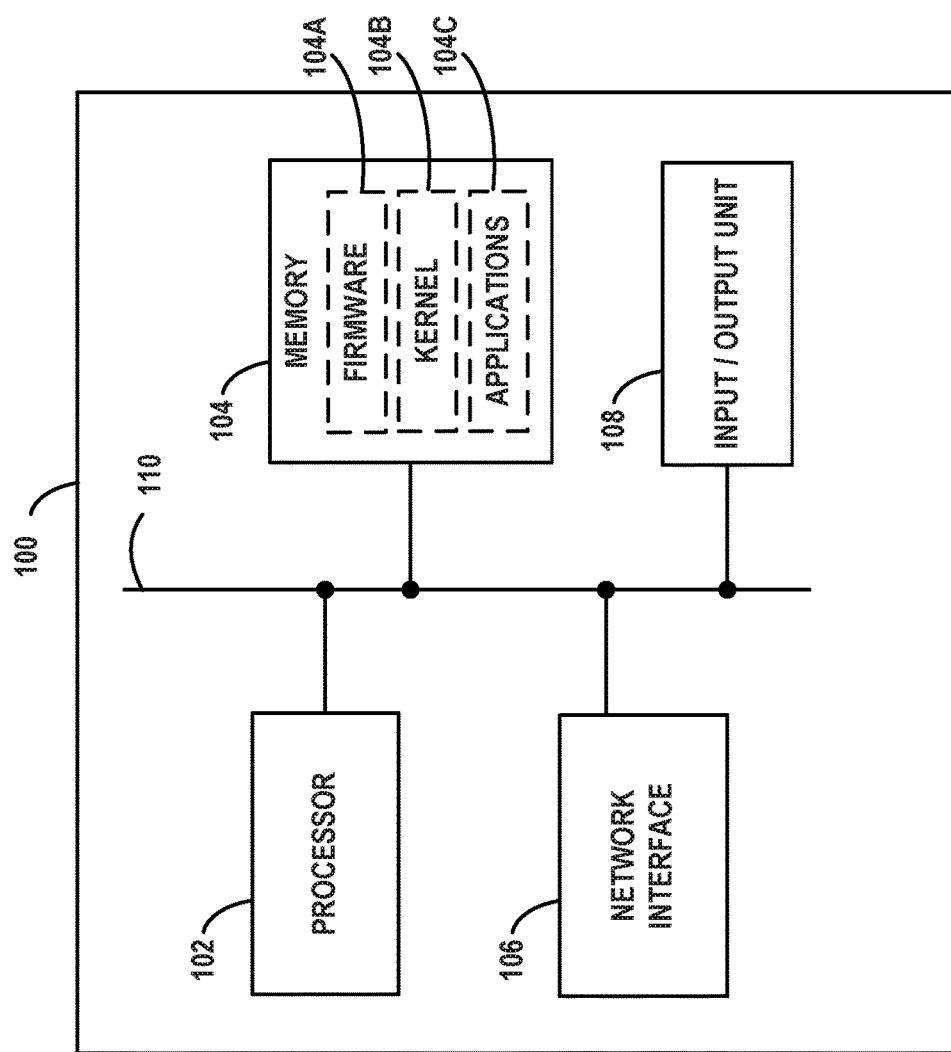
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
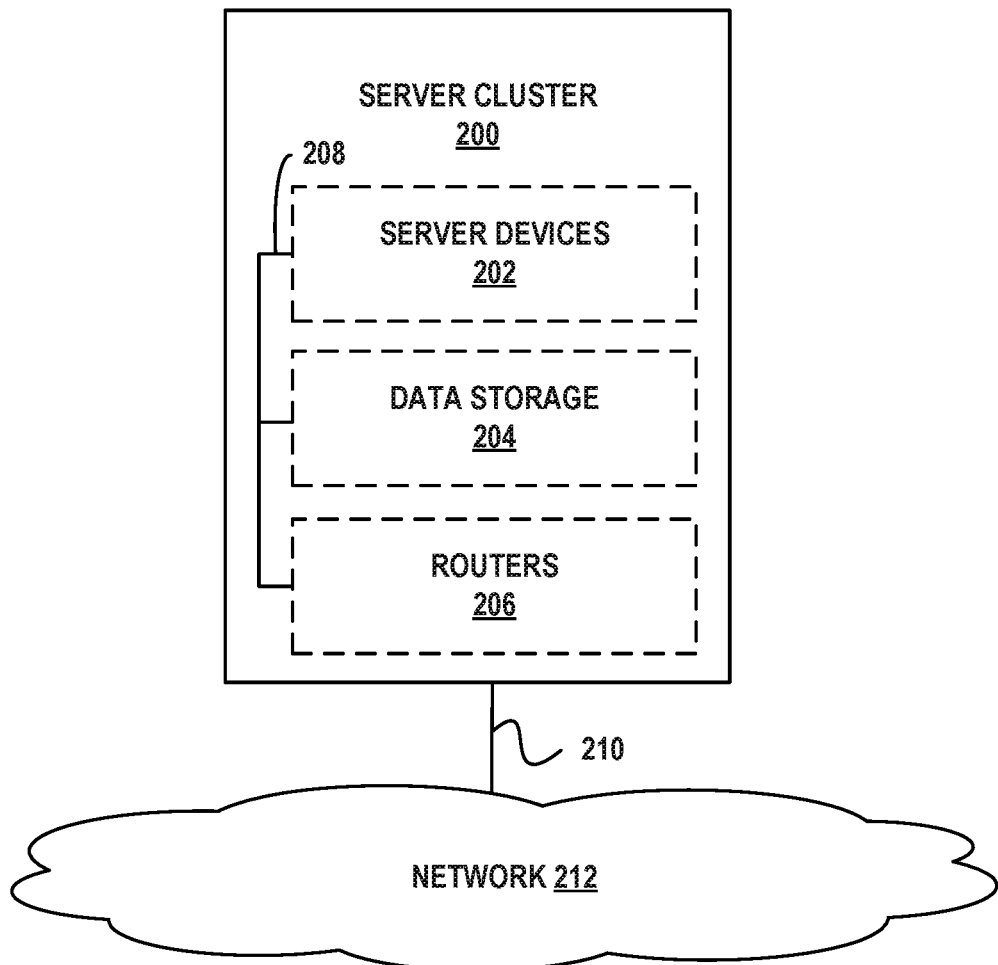
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

Example Remote Network Management Architecture

Figure 3:
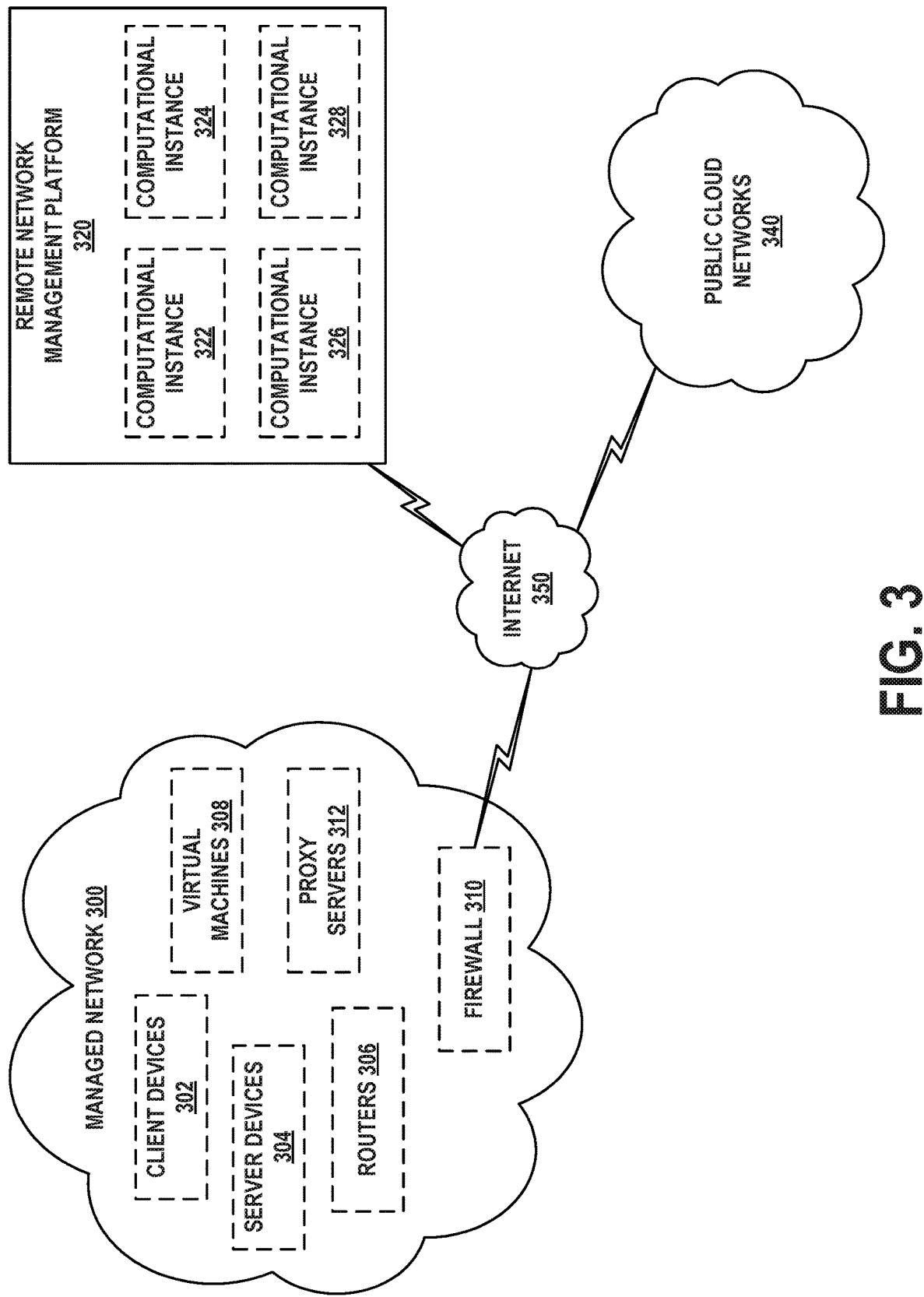
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

a. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

a. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

a. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

a. Communication Support and Other Operations

Internet 350 may represent a portion of the global Internet. However, Internet 350 may alternatively represent a different type of network, such as a private wide-area or local-area packet-switched network.

Figure 4:
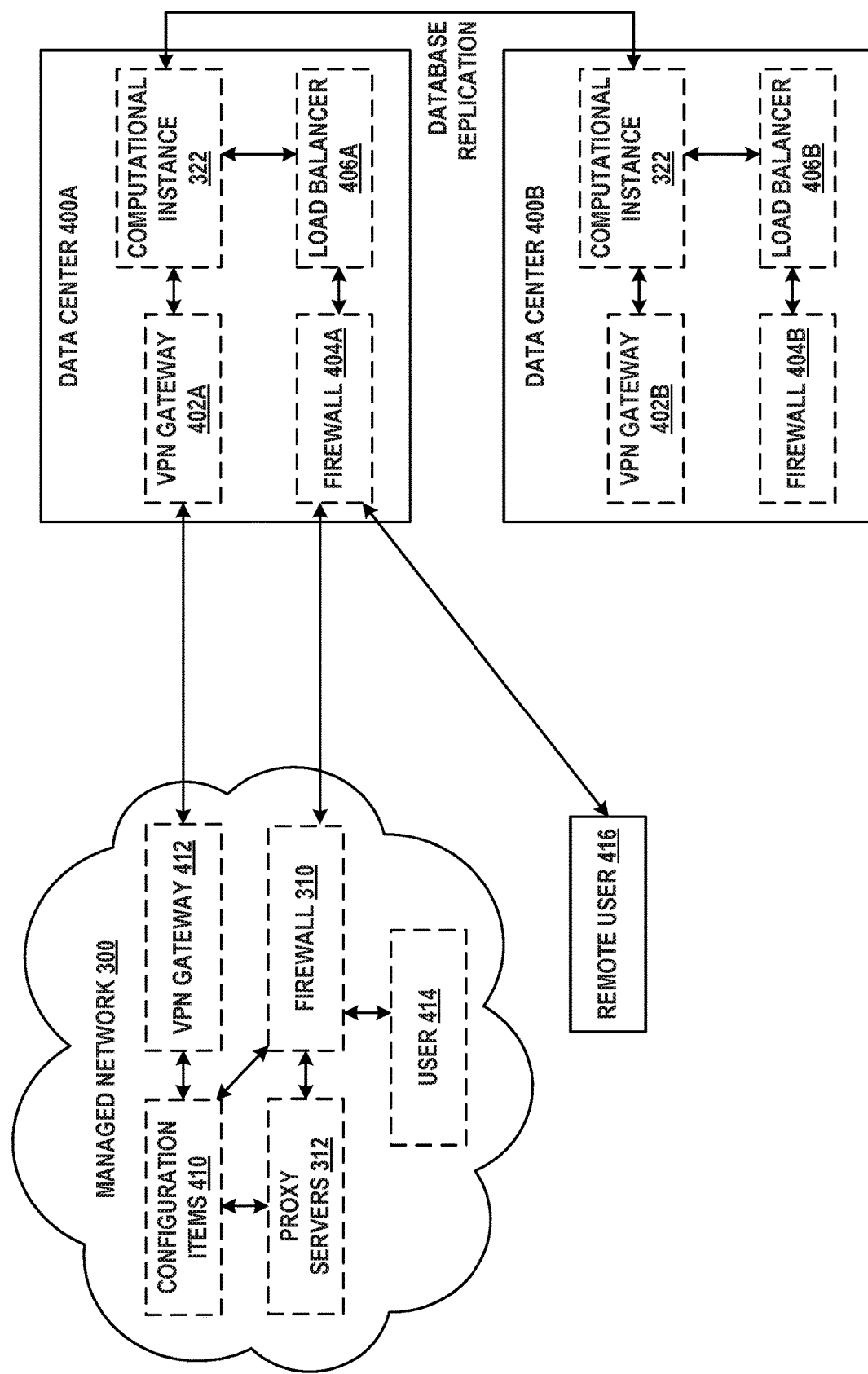
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
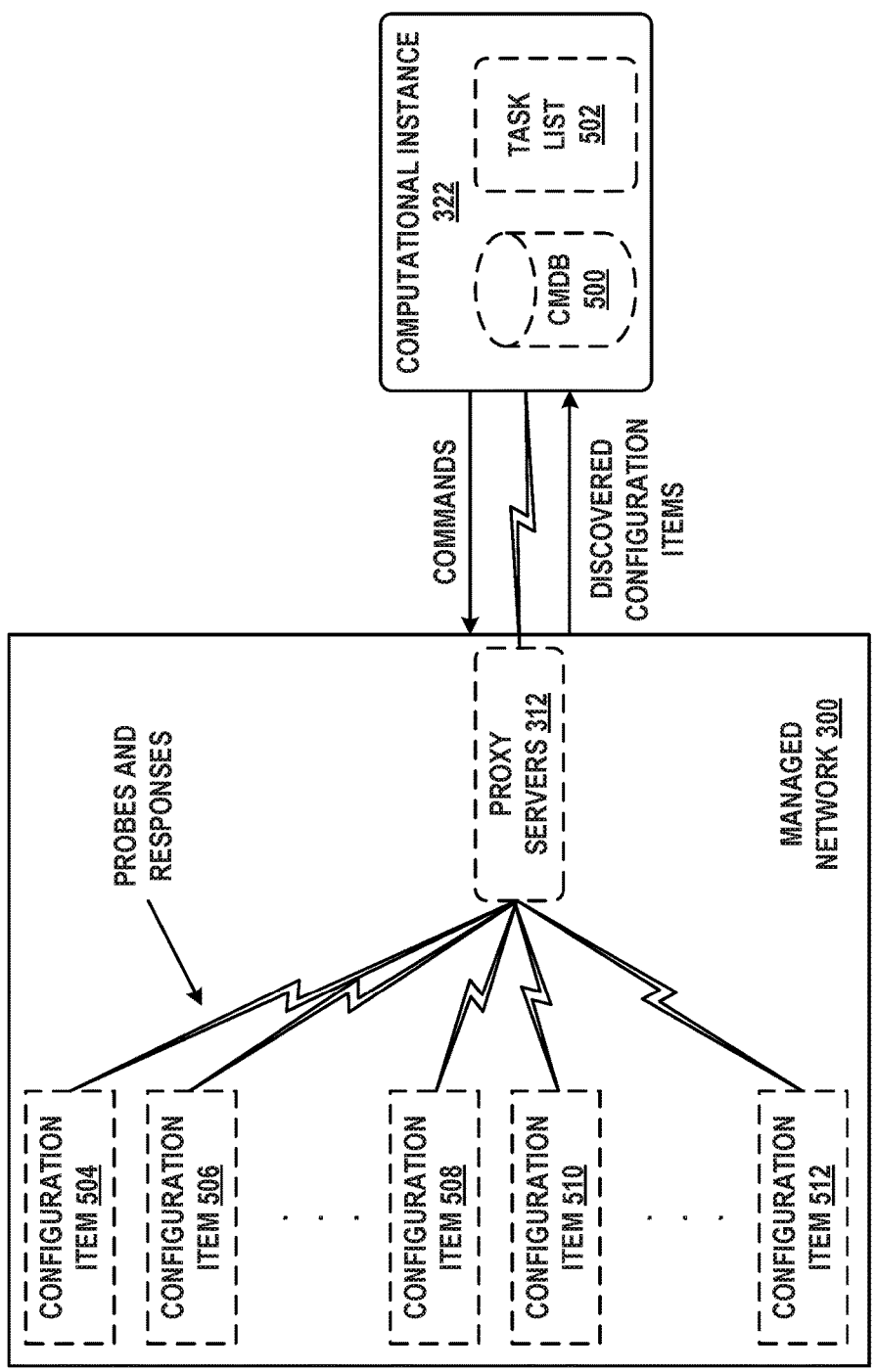
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address (es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
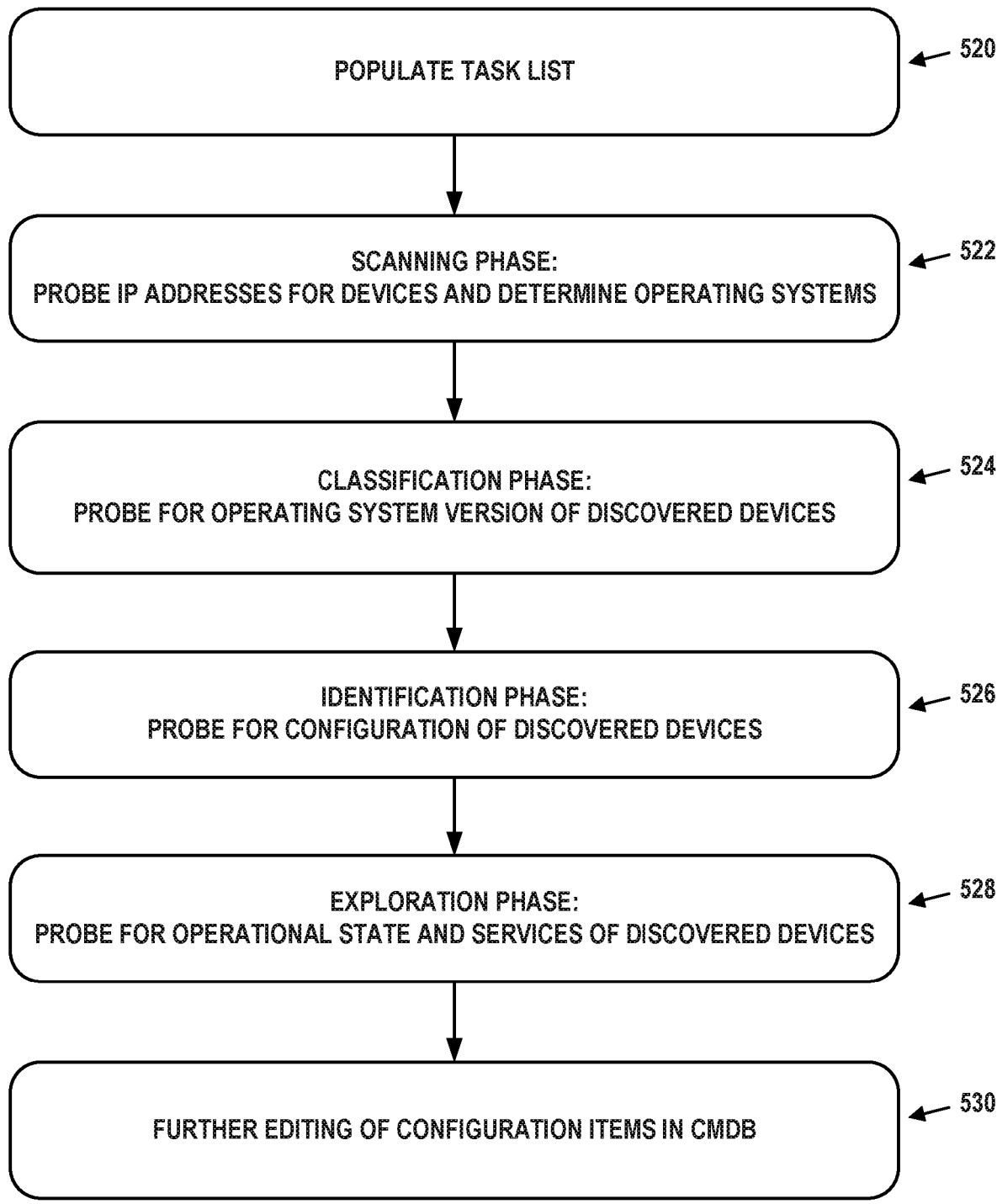
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

Example Quarantine Systems

As previously noted, a remote network management platform may be interested in hosting its services on computing resources (e.g., databases, virtual machines, software applications, and/or other resources) provided by a cloud network. Although the cloud network generally supplies most of the hardware and software to operate the computing resources, from time to time the remote network management platform may wish to provide updates to its software on the computing resources. For example, a computing resource may be running DEBIAN® LINUX® version 10.1.1, but the remote network management platform may want to use DEBIAN® LINUX® version 10.1.2. Such software updates may occur every day, every week, every few months, or every year.

While it may be advantageous to utilize the functionality provided by these software updates, occasionally the updates contain harmful features that could negatively affect the cloud network. For example, if the aforementioned DEBIAN® LINUX® version 10.1.2 contained a vulnerability that allowed a malicious attacker to gain administrative privileges to a virtual machine within the cloud network, then the entire cloud network could be compromised. To prevent these catastrophic scenarios, an administrator of the cloud network could assign a qualified agent to assess the risk level of the software update and responsively determine whether to approve or reject the update. To ensure these risk assessments are not tampered with, the administrator may further require that the qualified agent only perform risk assessments using computing devices that operate within the cloud network.

Though the above process can help prevent dangerous software updates from affecting the cloud network, it also makes it unduly time consuming and burdensome to deploy beneficial software updates onto the cloud network. Some cloud networks may contain thousands of computing resources, each of which may require several weekly software updates. As a result, qualified agents may be inundated with update requests from external users and may be unable to identify which software updates correspond to which computing resources on the cloud network. This could result in a large backlog of requests that prevents critical software updates from reaching computing resources on the cloud network.

To address this and other issues, the embodiments herein provide for a quarantine system that quickly and efficiently pushes software updates to computing resources operating within the cloud network. During operations, the described quarantine system may pull software updates from locations external to the cloud network and may store the updates into a "quarantine zone" located within the cloud network. The quarantine system may then assign suitable agents to evaluate the software updates within the quarantine zone. If an agent approves a software update, the quarantine system may push the update to a software repository or a destination computing resource on the cloud network. Advantageously, the described quarantine system reduces the effects of harmful software updates on the cloud network while simultaneously allowing beneficial software updates to be quickly installed on computing resources within the cloud network. Other benefits are also possible and will be realized from the discussion herein.

Figure 6:
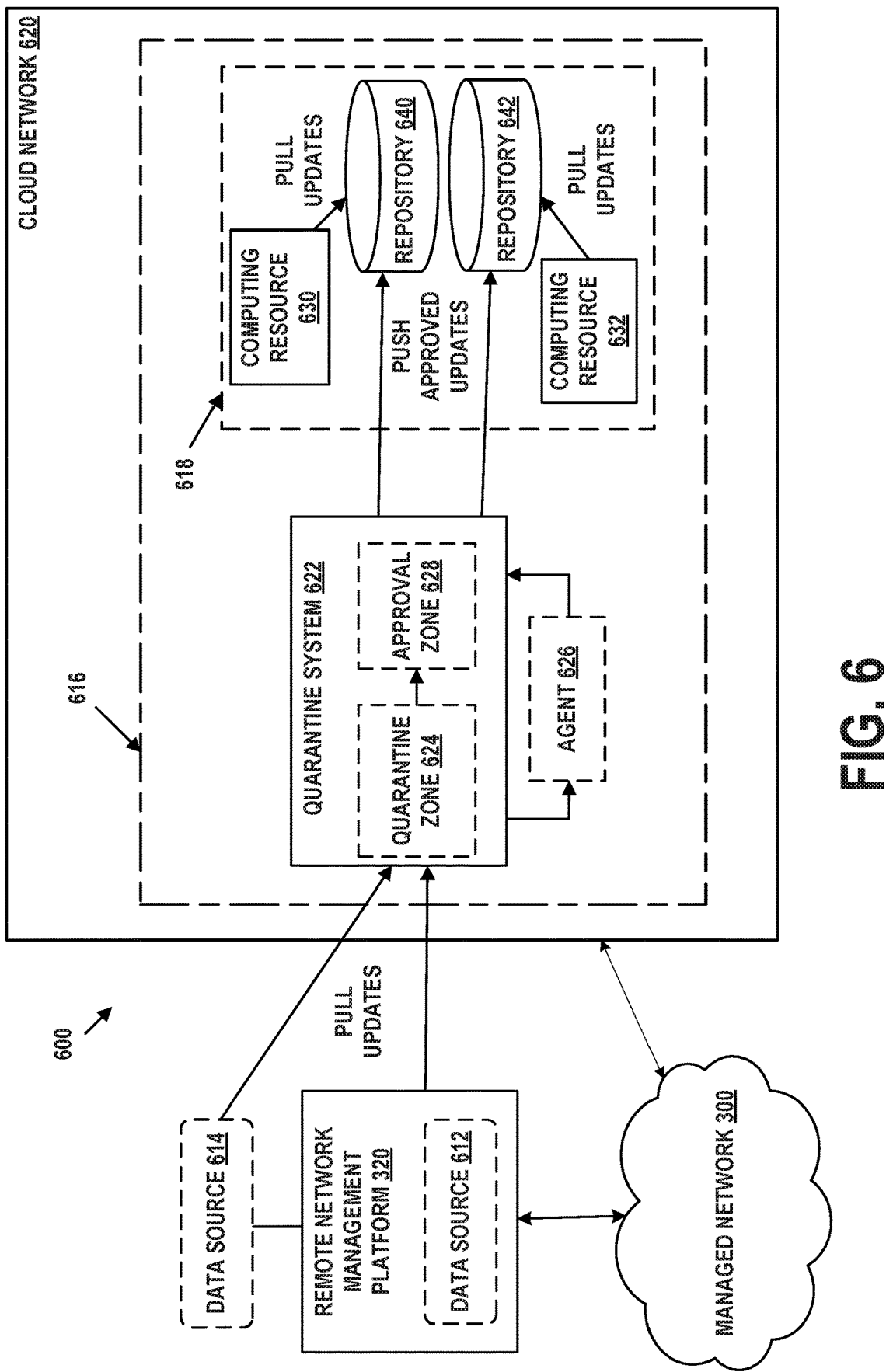
FIG. 6 is a network architecture, in accordance with example embodiments.

FIG. 6 depicts network architecture 600 that illustrates an example quarantine zone. Network architecture 600 includes three main components, managed network 300, remote network management platform 320, and cloud network 620, each of which may be communicatively connected by way of a wide-area network, such as Internet 350. In some examples, cloud network 620 may take on some or all of the properties discussed for public cloud networks 340.

Managed network 300 may be an enterprise network used by an entity for computing and communications tasks, as well as storage of data. Managed network 300 may be an enterprise customer of remote network management platform 320 and may interact with cloud network 620 to access services usually provided by remote network management platform 320 but that are hosted by computing resources on cloud network 620.

Remote network management platform 320 is a hosted environment that provides aPaaS services to users, particularly to the operator of managed network 300. These services may take the form of web-based portals, for example, using the aforementioned web-based technologies. To expand its operations, remote network management platform 320 may host some or all of its services via computing resources on cloud network 620. Because cloud network 620 supplies the hardware and software to operate these computing resources, the remote network management platform may not have to devote time maintaining the infrastructure to host its services and instead can focus on building new services for its users or upgrading existing services.

In example embodiments, remote network management platform 320 may include data source 612, which represents a software service/computing device that can provide software updates to computing resources operating in cloud network 620. As used herein, a software update or software-related update may refer to any update to the operation of a computing resource. This includes, but is not limited to, operating system updates, firmware updates, updates to existing software packages installed on the computing resource, new software packages to be installed on the computing resource, data updates, configuration file updates (e.g., RED HAT® Package Manager (RPM) file updates, TERRAFORM® configuration file updates, DOCKER® configuration file updates, PUPPET® manifests, NODE® Package Manager (NPM) configuration file updates, etc.), database schema updates, (e.g., structured query language (SQL) file updates), and so on. In example embodiments, data source 612 could take the form of a software repository (e.g., a LINUX® repository), a version control system (e.g., GITHUB® or GITLAB®), or a configuration management system (e.g., PUPPET® or CHEF®), among other possibilities. Remote network management platform 320 may also be communicatively coupled to data source 614, which also represents a software service/computing device that can provide software updates to computing resources operating in cloud network 620. However, unlike data source 612, data source 614 may be part of a remote network that is separate from remote network management platform 320.

Cloud network 620 may be a cloud based network that provides services to users within managed network 300, remote network management platform 320, or elsewhere. In some examples, cloud network 620 may contain one or more computational instances, similar to computational instance 322, which may be dedicated to managed network 300.

In some embodiments, cloud network 620 contains firewall 616 and firewall 618, both of which may be specialized routers or server devices that protect cloud network 620 from unauthorized attempts to access the devices, applications, and services therein, while allowing certain authorized communications. In examples, quarantine system 622 and agent 626 both operate behind (e.g., within the confines of and therefore protected by) firewall 616 but outside firewall 618. On the other hand, computing resource 630, computing resource 632, repository 640, and repository 642 all operate behind firewall 616 and behind firewall 618.

Firewall 616 may be configured to restrict updates from being transmitted to devices operating behind firewall 616. However, firewall 616 may be configured to admit software updates that are pulled by quarantine system 622 from remote network management platform 320. As used herein, the term "pull" refers to the act of receiving data at a destination only after the destination first requests the data from a source. For example, if quarantine system 622 pulls a software update from remote network management platform 320, this would mean that quarantine system 622 initiates a request for the software update and sends the request to remote network management platform 320, which in turn transmits the software update to quarantine system 622.

Similarly, firewall 618 may be configured to restrict updates from being transmitted to devices operating behind firewall 618. However, firewall 618 may be configured to admit software updates that are pushed by quarantine system 622 into software repository 640 or software repository 642 (or in some embodiments, to computing resource 630 and computing resource 632). As used herein, the term "push" refers to the act of transmitting data from a source to a destination without the destination first requesting the data. For example, if quarantine system 622 pushes a software update to software repository 640, this would mean that quarantine system 622 transfers the software update to software repository 640 without first receiving a request for the software update from software repository 640. Alternatively, in some embodiments, firewall 618 may be configured to admit software updates that are pulled by software repository 640 or software repository 642 from quarantine system 622.

Together, firewalls 616 and 618 prevent external devices/users from directly pushing software updates onto computing resources operating within cloud network 620. For example, exterior computing devices—such as devices within remote network management platform 320—may be unable to directly communicate software updates to computing resource 630 or computing resource 632. Yet, as noted above, some updates may be beneficial. Therefore, to discern between dangerous and beneficial updates, cloud network 620 may utilize quarantine system 622 to assess the risk of the updates.

Quarantine system 622 may be configured using a VLAN within cloud network 620 and may contain various devices, virtual machines, and software services that allow for the temporary storage and approval of software updates. Unlike other computing resources in cloud network 620, such as computing resource 630 and computing resource 632, quarantine system 622 is permitted by firewall 616 to pull software updates from remote network management platform 320.

After pulling software updates from remote network management platform 320, quarantine system 622 may temporarily store the updates in quarantine zone 624. Since the number of qualified agents operating in cloud network 620 is typically limited, quarantine zone 624 may place the software updates a queue. When an agent is available to perform a risk assessment, quarantine zone 624 may select a software update from the queue and then may transmit a representation of the content of the software update to the available agent for approval.

In some embodiments, quarantine zone 624 is configured only retain a software update for a pre-determined period of time, after which it will delete the update. For example, quarantine zone 624 may retain a software update for a day, a week, a month, or another period of time before deleting the update. The amount of time a given update is retained can be based on the type of software update (e.g., operating system update, firmware update, etc.), the destination/recipient of the software update (e.g., computing resource 630 versus computing resource 632), the source of the software update (e.g., data source 612 versus data source 614), a caching policy of quarantine zone 624 (e.g., Least Recently Used (LRU) or Least Frequently Used (LFU)), among other possibilities. In some embodiments, quarantine zone 624 may be configured to retain a software update until it receives newer version of the software update (e.g., quarantine zone 624 may retain a DEBIAN® LINUX® version 10.1.1 update until it receives a subsequent version, after which it will delete the DEBIAN® LINUX® version 10.1.1 update).

In some embodiments, quarantine zone 624 selects software updates from the queue in accordance with a priority order. The priority order may be based on, for example, the destination/recipient of the software updates (e.g., quarantine zone 624 may select software updates destined for computing resource 630 before selecting software updates related to computing resource 632), the type of the software updates (e.g., quarantine zone 624 may select operating system updates for approval before selecting firmware updates), the source of the software updates (e.g., quarantine zone 624 may select software updates from data source 612 before selecting software updates from data source 614), the urgency of the software updates (e.g., quarantine zone 624 may select software updates that are indicated as urgent for approval before selecting software updates that are not indicated as urgent), among other possibilities.

Agent 626 may represent a computing device equipped with a graphical interface that allows a qualified agent to view a representation of the content of a software update and evaluate computing resources on cloud network 620 that may be affected by the update. The qualified agent could then use the details provided by the graphical interface as a basis to approve or reject the software update. The graphical interface could contain various features to allow agent 626 to properly assess the risk level of the update.

In some embodiments, the graphical interface could provide a side by side comparison between the content of a software update for a computing resource and the content of the software currently installed on the computing resource. This comparison allows the qualified agent to assess the "delta" between the update and the currently installed software—the particular pieces of information that changed between software update and the currently installed software. In some cases, if multiple software updates for the same computing resource are pending approval (e.g., quarantine zone 624 contains three unapproved operating system updates for computing resource 630), the graphical interface could provide a side by side comparison between the content of each of the unapproved updates, allowing the qualified agent to simultaneously assess multiple deltas. Alternatively, rather than providing the side by side comparison, the graphical interface could provide an entire representation of the content of a given software update.

In some embodiments, the graphical interface could provide a representation of a "dependency tree." This tree provides a framework for evaluating how different computing resources on cloud network 620 are operationally connected and thus allows the qualified agent to graphically identify how software updates to certain computing resources could ripple across to other computing resources. For example, computing resource 630 could be using a database that is operating on computing resource 632 and thus software updates to computing resource 632 will indirectly affect computing resource 630. The qualified agent could harness the dependency tree to determine the risk level of a given update. For instance, if a software update was identified to indirectly affect a mission critical computing resource, such as an authentication server, then the qualified agent may be less inclined to approve the update or may give it more scrutiny than if the update only affected non-essential computing resources.

In scenarios where agent 626 decides to reject a software update, quarantine system 622 may be configured to notify relevant individuals, such as security personnel or administrators, about the rejection. In turn, these individuals may request information from agent 626 regarding the reason for the rejection and/or may request information from the data source that provided the software update. In some embodiments, when agent 626 rejects a software update, quarantine system 622 may isolate all other software updates that are associated with the rejected update. The associated updates may include, for example, other software updates that come from the same data source as the rejected update, other software updates that have the same destination/recipient as the rejected update, among other possibilities. The software updates that are associated with the rejected update may remain in abeyance (e.g., prevented from being approved or rejected by qualified agents) until concerns with the rejected update are resolved by the relevant individuals.

In scenarios where agent 626 approves a software update, agent 626 may provide an indication to quarantine system 622 that the software update has approved, after which quarantine system 622 may move the software update from quarantine zone 624 into approval zone 628. From approval zone 628, quarantine system 622 may push the approved software update to one or more repositories, such as software repository 640 or software repository 642, located behind firewall 618. Computing resources, such as computing resource 630 or computing resource 632, can then pull the software updates from the repositories and install the updates. In some embodiments, quarantine system 622 may be configured to directly push approved software updates to computing resources operating behind firewall 618. Advantageously, by keeping the software update in quarantine zone 624 until it is approved by agent 626, quarantine system 622 ensures that unapproved updates are unlikely to reach, and thus negatively affect, computing resources operating on cloud network 620.

To facilitate the approval process described above, quarantine system 622 may use one or more mapping tables. These mapping tables could be provided by an administrator of cloud network 620 and could be stored in a persistent storage disposed within cloud network 620. These tables help establish: (i) details about the source locations that provide software updates, (ii) details about destination repositories/computing resources that should receive the software updates, (iii) details about qualified agents that should be assigned to approve or reject software updates, and (iv) a frequency for when quarantine system 622 should request software updates.

Figure 7:
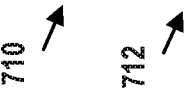
FIG. 7 is a mapping table, in accordance with example embodiments.

An example mapping table 700 is provided in FIG. 7. As displayed, mapping table 700 includes record 710 and record 712, both of which have corresponding entries in source column 702, destination column 704, agent column 706, and frequency column 708.

Source column 702 provides quarantine system 622 with the necessary details for pulling a software update from a data source on remote network management platform 320. For example, source column 702 may provide the uniform resource locator (URL) for the data source, the protocol/command (e.g., a "git clone" command or an "rsync" command sent via HTTP or Secure Shell (SSH)) that quarantine system 622 should use to pull the software update from the data source, and other relevant details, such as passwords or account information. As shown in FIG. 7, the source column 702 entry for record 710 indicates that software updates associated with record 710 should be pulled from data source 612. Similarly, the source column 702 entry for record 712 indicates that software updates associated with record 712 should be pulled from data source 614.

Destination column 704 provides quarantine system 622 with the necessary details for transmitting a software update to a software repository/computing resource operating within cloud network 620. For example, destination column 704 may provide the URL for the computing resource, the protocol/command (e.g., a Hypertext Transfer Protocol (HTTP), File Transfer Protocol (FTP), or Simple Text Oriented Message Protocol (STOMP)) that quarantine system 622 should use to transmit the software update to the computing resource, and other relevant details. As shown in FIG. 7, the destination column 704 entry for record 710 indicates that software updates associated with record 710 should be transmitted to computing resource 630. Similarly, the destination column 704 entry for record 712 indicates that software updates associated with record 712 should be transmitted to software repository 640.

Agent column 706 provides quarantine system 622 with details on a target agent or group of agents that may be best equipped to evaluate a software update. The determination of the target agent or group of agents best equipped for a particular software update may depend on the type of the particular software update (e.g., operating system update, firmware update, etc.), the source of the particular software update (e.g., data source 612 versus data source 614), or the destination/recipient of the particular software update (e.g., computing resource 630 versus computing resource 632), among other possibilities. If the target agent or group of agents for a software update is unavailable, quarantine system 622 may transmit the software update to another agent. As shown in FIG. 7, the agent column 706 entry for record 710 indicates that software updates associated with record 710 should be sent to be approved by agent 626. Likewise, the agent column 706 entry for record 712 indicates that software updates associated with record 712 should also be sent to be approved by agent 626.

Frequency column 708 provides quarantine system 622 with details on the frequency in which it should request a software update from a data source. The determination of the frequency from a particular software update may depend on the type of the particular software update (e.g., operating system update, firmware update, etc.), the source of the particular software update (e.g., data source 612 versus data source 614), or the destination of the particular software update (e.g., computing resource 630 versus computing resource 632), among other possibilities. As shown in FIG. 7, the frequency column 708 entry for record 710 indicates that software updates associated with record 710 should be queried every 27 hours. Similarly, the frequency column 708 entry for record 712 indicates that software updates associated with record 712 should be queried every 30 hours.

Notably, the layout and entries in mapping table 700 are provided as an example and are not intended to be limiting with respect to the embodiments herein. In other examples, mapping table 700 may contain fewer, more, or different columns, rows, and entries.

Figure 8:
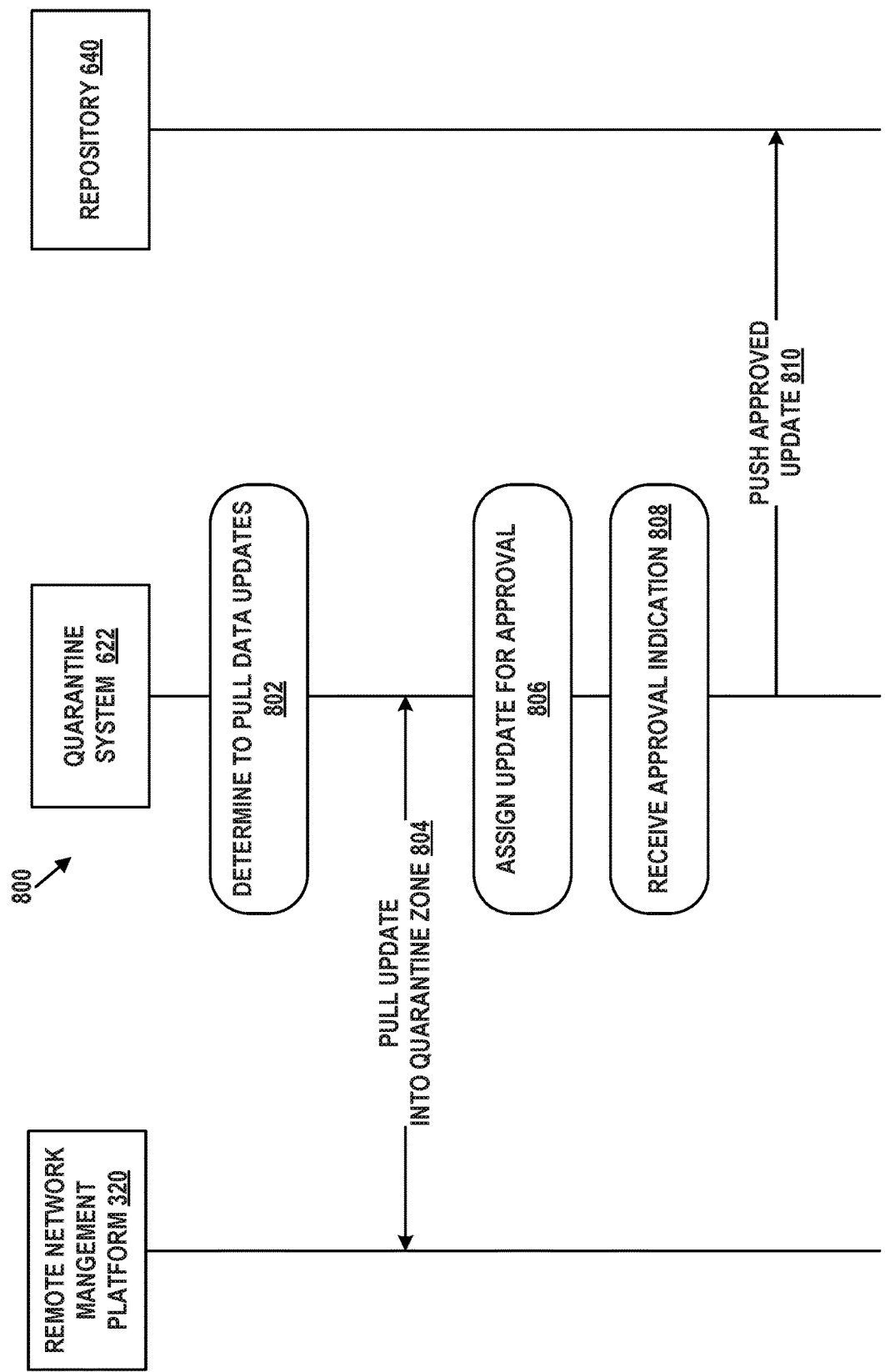
FIG. 8 is a message flow, in accordance with example embodiments.

FIG. 8 depicts message flow 800, in accordance with example embodiments. In particular, message flow 800 illustrates how quarantine system 622 can use the entries in mapping table 700 (or another set of rules) to pull software updates from remote network management platform 320, initiate a risk assessment process to approve the update, and then push the approved software update to a software repository operating within cloud network 620. By way of example, message flow 800 may utilize remote network management platform 320, quarantine system 622, and software repository 640 during operation. However, additional components, steps, or blocks, may be added to message flow 800 without departing from the embodiments herein.

At step 802, quarantine system 622 determines to pull a software update from remote network management platform 320. This step could involve, for example, using the information provided in frequency column 708 of mapping table 700 to determine that the software update should be pulled into quarantine system 622. In some embodiments, step 802 could be initiated manually; that is an administrator or other authorized personnel from cloud network 620 request that quarantine system 622 pull an update from remote network management platform 320. In some embodiments, step 802 could involve quarantine system 622 querying remote network management platform 320 to determine whether any software updates are available to be pulled into quarantine system 622.

At step 804, quarantine system 622 requests a software update from a data source on remote network management platform 320 and temporarily stores the update in quarantine zone 624. This step could involve, for example, using the information provided in source column 702 of mapping table 700 to determine the URL and appropriate commands obtain the software update from the data source. For example, if the URL for a software update is "http://myupdate.com/update" and appropriate command is "git clone", then quarantine system 622 could use the command "git clone http://myupdate.com/update" to pull the software update from remote network management platform 320.

At step 806, quarantine system 622 assigns the software update retrieved in step 804 to an available agent. This step could involve, for example, using the information provided in agent column 706 of mapping table 700 to determine a qualified agent that is best suited to assess the risk of the update retrieved in step 804. If the qualified agent is available, quarantine system 622 may transmit a representation of the software update, perhaps in the form of a graphical user interface, to the qualified agent. Otherwise, if the qualified agent is not available, quarantine system 622 may identify an alternative agent that is available and may transmit the representation to the alternative agent. If no agent is available, quarantine system 622 may place the software update in a queue in quarantine zone 624. The update may remain in the queue until it can be assigned by quarantine system 622 to an available agent. At step 808, quarantine system 622 receives an indication from the assigned agent that the software update is approved.

At step 810, quarantine system 622 pushes the approved software update to software repository 640. This step could involve, for example, using the information provided in destination column 704 of mapping table 700 to determine the software repository within cloud network 620 that should receive the approved update. Once in software repository 640, one or more computing resources within cloud network 620 may pull the software update from software repository 640 and may install the update.

Example Operations

Figure 9:
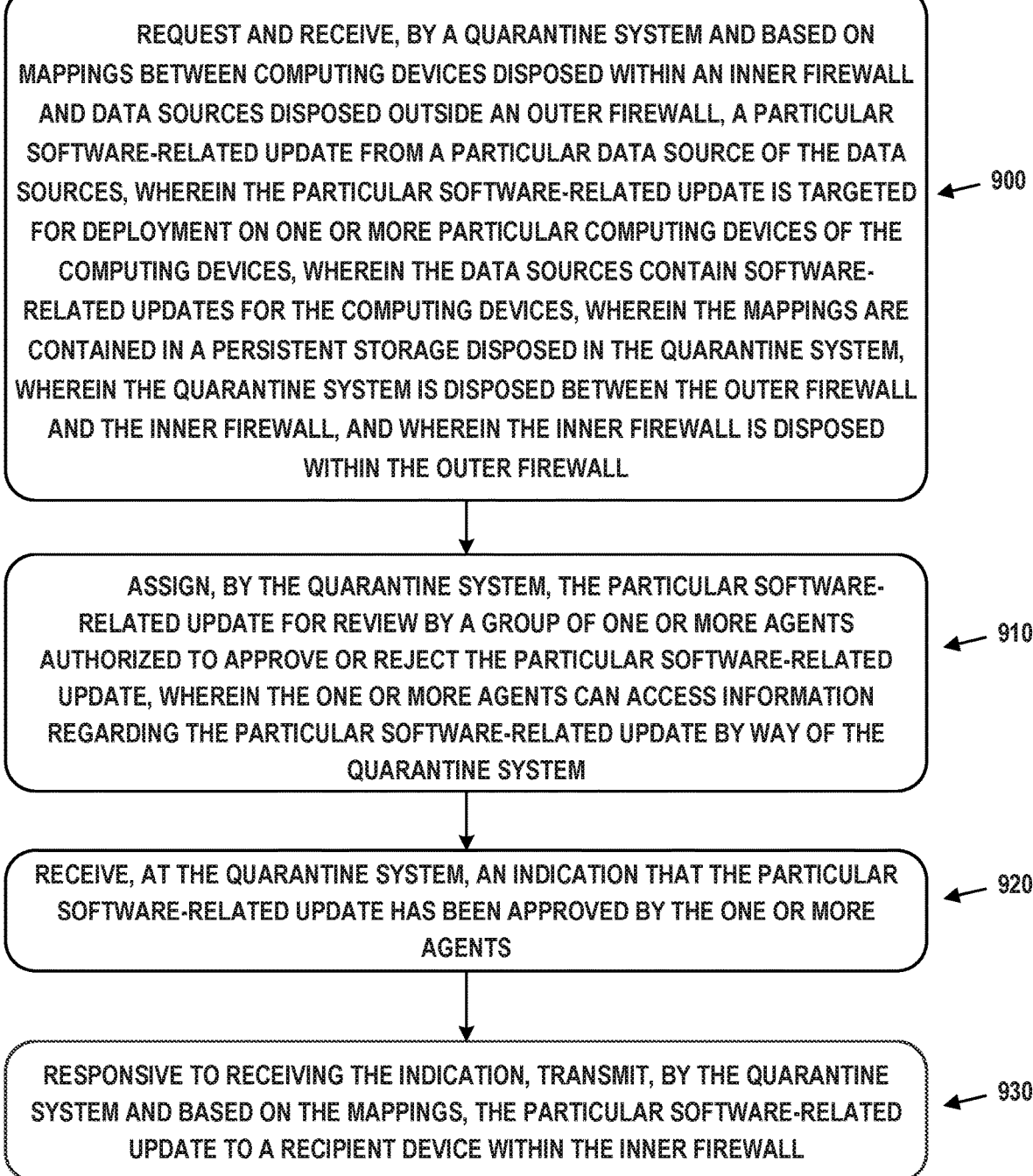
FIG. 9 is a flow chart, in accordance with example embodiments.

FIG. 9 is a flow chart illustrating an example embodiment. The process illustrated by FIG. 9 may be carried out by a computing device, such as computing device 100, and/or a cluster of computing devices, such as server cluster 200. However, the process can be carried out by other types of devices or device subsystems. For example, the process could be carried out by carried out by one or more computing devices configured as a quarantine system.

The embodiments of FIG. 9 may be simplified by the removal of any one or more of the features shown therein. Further, these embodiments may be combined with features, aspects, and/or implementations of any of the previous figures or otherwise described herein.

Block 900 may involve requesting and receiving, by a quarantine system and based on mappings between computing devices disposed within an inner firewall and data sources disposed outside an outer firewall, a particular software-related update from a particular data source of the data sources. The particular software-related update may be targeted for deployment on one or more particular computing devices of the computing devices. The data sources may contain software-related updates for the computing devices. The mappings may be contained in a persistent storage disposed in the quarantine system. The quarantine system may be disposed between the outer firewall and the inner firewall. The inner firewall may be disposed within the outer firewall.

Block 910 may involve assigning, by the quarantine system, the particular software-related update for review by a group of one or more agents authorized to approve or reject the particular software-related update. The one or more agents may access information regarding the particular software-related update by way of the quarantine system.

Block 920 may involve receiving, at the quarantine system, an indication that the particular software-related update has been approved by the one or more agents.

Block 930 may involve, responsive to receiving the indication, transmitting, by the quarantine system and based on the mappings, the particular software-related update to a recipient device within the inner firewall.

In some embodiments, the data sources operate within a remote network management platform, and the remote network management platform hosts its software services on at least one of the computing devices disposed within the inner firewall.

In some embodiments, the remote network management platform provides software services to a managed network and the software services provided by the remote network management platform to the managed network are provided by way of at least one of the computing devices disposed within the inner firewall.

In some embodiments, the recipient device is one of the computing devices disposed within the inner firewall.

In some embodiments, the recipient device is a software repository disposed within the inner firewall and at least some of the computing devices disposed within the inner firewall are configured to request and receive software-related updates from the software repository.

In some embodiments, the mappings further contain respective frequencies for requesting the software-related updates. Such embodiments may further involve requesting and receiving, based on the mappings, a second particular software-related update from the particular data source, the second particular software-related update requested by the quarantine system in a threshold time period after receiving the particular software-related update, the threshold time period being based on the mappings. Such embodiments may further involve assigning the second particular software-related update for review by the group of one or more agents. Such embodiments may further involve receiving an indication that the second particular software-related update has been approved by the one or more agents. Such embodiments may further involve responsive to receiving the indication that the second particular software-related update has been approved, transmitting, based on the mappings, the second particular software-related update to the recipient device.

In some embodiments, the respective frequencies vary between the data sources of the software-related updates.

In some embodiments, the respective frequencies vary between recipient devices for the software-related updates.

In some embodiments, the mappings further contain respective target groups of agents associated with the software-related updates and assigning the particular software-related update for review by the group of one or more agents comprises assigning, based on the mappings, the particular software-related update to a target group of agents associated with the particular software-related update.

In some embodiments, the respective target groups of agents vary between the data sources of the software-related updates.

In some embodiments, the respective target groups of agents vary between recipient devices for the software-related updates.

Some embodiment involve after receiving the particular software-related update, storing the particular software-related update in a queue disposed within the quarantine system; determining that at least one agent in the group of one or more agents is available to review the particular software-related update; and in response to at least one agent in the group of one or more agents being available to review the particular software-related update, transmitting a representation of the particular software-related update to at least one agent.

In some embodiments, transmitting the representation of the particular software-related update to the at least one agent involves providing, to the at least one agent, a representation of a dependency tree, the dependency tree identifying all computing devices operating disposed within the inner firewall that are affected by the particular software-related update.

In some embodiments, transmitting the representation of the particular software-related update to the at least one agent involves providing, to the at least one agent, a graphical interface containing a comparison between content of the particular software-related update and content of a previous version of the particular software-related update.

In some embodiments, requesting and receiving the particular software-related update from the particular data source is initiated by the quarantine system.

In some embodiments, transmitting the particular software-related update to the recipient device is initiated by the quarantine system.

Some embodiment involve requesting and receiving, based on the mappings, a second particular software-related update from a second particular data source of the data sources, where the second particular software-related update is targeted for deployment on one or more second particular computing devices of the computing devices. Such embodiments may further involve assigning the second particular software-related update for review by the group of one or more agents. Such embodiments may further involve receiving an indication that the second particular software-related update has been rejected by the one or more agents. Such embodiments may further involve responsive to receiving the indication that the second particular software-related update has been rejected, transmitting, to the group of one or more agents, a request for information from the group of one or more agents regarding a reason for rejecting the second particular software-related update.

Some embodiments involve responsive to receiving the indication that the second particular software-related update has been rejected, isolating software-related updates that are associated with the second particular software-related update from being assigned for review by any agent.

In some embodiments, the group of one or more agents operate within the outer firewall.

In some embodiments, computing devices disposed within the outer firewall are only allowed to receive authorized communications from computing devices outside the outer firewall, wherein the authorized communications include communications requested by the quarantine system and originating from the data sources.

In some embodiments, computing devices disposed within the inner firewall are only allowed to receive authorized communications from computing devices outside the inner firewall, wherein the authorized communications include communications transmitted by the quarantine system to the recipient device.

In some embodiments, a system may involve means for requesting and receiving, based on mappings between computing devices disposed within an inner firewall and data sources disposed outside an outer firewall, a particular software-related update from a particular data source of the data sources, where the particular software-related update is targeted for deployment on one or more particular computing devices of the computing devices, where the data sources contain software-related updates for the computing devices, where the mappings are contained in a persistent storage disposed in a quarantine system, where the quarantine system is disposed between the outer firewall and the inner firewall, and where the inner firewall is disposed within the outer firewall. The system may further involve means for assigning the particular software-related update for review by a group of one or more agents authorized to approve or reject the particular software-related update, wherein the one or more agents can access information regarding the particular software-related update by way of the quarantine system. The system may further involve means for receiving an indication that the particular software-related update has been approved by the one or more agents. The system may further involve means for, responsive to receiving the indication, transmitting, based on the mappings, the particular software-related update to a recipient device within the inner firewall.

CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A quarantine system comprising:
   one or more processors disposed between an outer firewall and an inner firewall of a same cloud network, wherein the inner firewall is disposed behind the outer firewall; and
   a memory storing instructions that, when executed by the one or more processors, cause the one or more processors to perform operations comprising:
      requesting a software-related update from a data source disposed outside the outer firewall, wherein the software-related update is targeted for deployment on one or more computing devices disposed behind the outer firewall and the inner firewall;
      pulling the software-related update from the data source disposed outside the outer firewall into a quarantine zone of the quarantine system that is positioned behind the outer firewall and outside of the inner firewall; and
      assigning the software-related update for review by one or more agents authorized to approve or reject the software-related update, wherein an approval of the software-related update enables the software-related update to be pushed from the quarantine zone disposed behind the outer firewall and outside of the inner firewall through the inner firewall to the one or more computing devices disposed behind the inner firewall.

2. The quarantine system of claim 1, wherein the outer firewall is configured to restrict one or more updates that have not been requested by the quarantine system from being transmitted through the outer firewall to the quarantine zone of the quarantine system.

3. The quarantine system of claim 1, wherein the inner firewall is configured to:
   restrict one or more first updates that have not been requested by the quarantine system from being transmitted to the one or more computing devices disposed behind the outer firewall and the inner firewall; and
   permit one or more second updates that have been requested by the quarantine system and approved by the one or more agents to be transmitted to the one or more computing devices.

4. The quarantine system of claim 1, wherein the one or more agents are disposed within the quarantine zone positioned between the outer firewall and the inner firewall.

5. The quarantine system of claim 1, wherein the operations comprise:
   storing the software-related update in a queue of the quarantine zone for approval or rejection by the one or more agents, wherein the queue comprises a plurality of software-related updates; and
   assigning one or more software-related updates from the queue for approval or rejection by the one or more agents based on a priority order, wherein the priority order is based on a destination of each software-related update of the plurality of software-related updates, a source of each software-related update of the plurality of software-related updates, a type of each software-related update of the plurality of software-related updates, or an urgency of each software-related update of the plurality of software-related updates, or any combination thereof.

6. The quarantine system of claim 1, wherein the operations comprise:

storing the software-related update in a queue of the quarantine zone for approval or rejection by the one or more agents, wherein the queue comprises a plurality of software-related updates; and deleting one or more software-related updates from the queue after a pre-determined period of time has elapsed since storing the one or more software-related updates in the queue, wherein the pre-determined period of time is based on a destination of each software-related update of the plurality of software-related updates, a source of each software-related update of the plurality of software-related updates, a type of each software-related update of the plurality of software-related updates, a caching policy of the quarantine system, or receiving a newer version of at least one software-related update of the plurality of software-related updates, or any combination thereof.

7. The quarantine system of claim 1, wherein the operations comprise:

receiving an indication of a rejection of the software-related update by the one or more agents;

providing a notification indicative of the rejection of the software-related update in response to receiving the indication of the rejection of the software-related update; and restricting the software-related update from being transmitted through the inner firewall to the one or more computing devices based on the rejection.

8. The quarantine system of claim 1, wherein the operations comprise:

receiving an indication of a rejection of the software-related update by the one or more agents; and isolating one or more additional software-related updates associated with the software-related update from being assigned to the one or more agents in response to receiving the indication of the rejection of the software-related update.

9. The quarantine system of claim 1, wherein the inner firewall is configured to restrict the software-related update that has been pulled through the outer firewall and into the quarantine zone from being pushed across the inner firewall to the one or more computing devices disposed behind the inner firewall until the approval is received.

10. A method, comprising:

requesting, by one or more processors of a quarantine system disposed between an inner firewall and an outer firewall of a same cloud network, a software-related update from a data source disposed outside the outer firewall, wherein the inner firewall is disposed behind the outer firewall, and wherein the software-related update is targeted for deployment on one or more computing resources disposed behind the outer firewall and the inner firewall;

pulling, by the one or more processors of the quarantine system, the software-related update from the data source disposed outside the outer firewall into a quarantine zone of the quarantine system, wherein the quarantine zone is disposed between the outer firewall and the inner firewall; and assigning, by the one or more processors of the quarantine system, the software-related update for review by one or more agents authorized to approve or reject the software-related update, wherein the inner firewall is configured to restrict the software-related update that has been pulled through the outer firewall from being pushed from the quarantine zone through the inner firewall to the one or more computing resources until an approval of the software-related update is received.

11. The method of claim 10, comprising providing a representation of a graphical user interface (GUI) configured to provide information associated with the software-related update for viewing by the one or more agents.

12. The method of claim 11, wherein the GUI is configured to provide a comparison of content of the software-related update and additional content installed on a computing resource of the one or more computing resources, or a dependency tree indicative of connections between the one or more computing resources, or both.

13. The method of claim 10, comprising:

storing, by the one or more processors of the quarantine system, the software-related update in a queue of the quarantine zone for approval or rejection by the one or more agents, wherein the queue comprises a plurality of software-related updates;

assigning, by the one or more processors of the quarantine system, one or more software-related updates from the queue for approval or rejection by the one or more agents based on a priority order, wherein the priority order is based on a plurality of factors comprising a destination of each software-related update of the plurality of software-related updates, a source of each software-related update of the plurality of software-related updates, a type of each software-related update of the plurality of software-related updates, or an urgency of each software-related update of the plurality of software-related updates, or any combination thereof; and deleting, by the one or more processors of the quarantine system, one or more additional software-related updates from the queue after a pre-determined period of time has elapsed since storing the one or more additional software-related updates in the queue, wherein the pre-determined period of time is based on one or more of the plurality of factors.

14. The method of claim 10, comprising:

receiving, by the one or more processors of the quarantine system, an indication of a rejection of the software-related update by the one or more agents;

providing, by the one or more processors of the quarantine system, a notification indicative of the rejection of the software-related update in response to receiving the indication of the rejection of the software-related update;

restricting, by the one or more processors of the quarantine system, the software-related update from being transmitted through the inner firewall to the one or more computing resources based on the rejection; and isolating, by the one or more processors of the quarantine system, one or more additional software-related updates associated with the software-related update from being assigned to the one or more agents in response to receiving the indication of the rejection of the software-related update.

15. The method of claim 10, wherein the approval enables the software-related update to be pushed through the inner firewall to the one or more computing devices disposed behind the inner firewall without the one or more computing devices requesting the software-related update.

16. A non-transitory computer-readable medium comprising computer readable instructions, that when executed by one or more processors of a quarantine system disposed between an inner firewall and an outer firewall of a same cloud network, cause the one or more processors to perform operations comprising:

requesting, by one or more processors, a software-related update from a data source disposed outside the outer firewall, wherein the inner firewall is disposed behind the outer firewall, and wherein the software-related update is targeted for deployment on one or more computing devices disposed behind the outer firewall and the inner firewall;

pulling, by the one or more processors, the software-related update from the data source disposed outside the outer firewall into a quarantine zone of the quarantine system, wherein the quarantine zone is disposed between the outer firewall and the inner firewall; and assigning, by the one or more processors, the software-related update for review by one or more agents authorized to approve or reject the software-related update, wherein an approval of the software-related update enables the software-related update to be pushed from the quarantine zone disposed behind the outer firewall and outside of the inner firewall through the inner firewall to the one or more computing devices disposed behind the inner firewall.

17. The non-transitory computer-readable medium of claim 16, wherein the outer firewall is configured to restrict one or more updates that have not been requested by the quarantine system from being transmitted through the outer firewall to the quarantine zone of the quarantine system.

18. The non-transitory computer-readable medium of claim 16, wherein the inner firewall is configured to:

restrict one or more first updates that have not been requested by the quarantine system from being transmitted to the one or more computing devices disposed within the inner firewall; and permit one or more second updates that have been requested by the quarantine system and approved by the one or more agents to be transmitted to the one or more computing devices.

19. The non-transitory computer-readable medium of claim 16, wherein the operations comprise:

receiving an indication of a rejection of the software-related update by the one or more agents;

providing a notification indicative of the rejection of the software-related update in response to receiving the indication of the rejection of the software-related update;

restricting the software-related update from being transmitted through the inner firewall to the one or more computing devices based on the rejection; and isolating one or more additional software-related updates associated with the software-related update from being assigned to the one or more agents in response to receiving the indication of the rejection of the software-related update.

20. The non-transitory computer-readable medium of claim 16, wherein the software-related update is one of a plurality of software-related updates that have been pulled through the outer firewall into the quarantine zone, and wherein the quarantine zone comprises a queue configured to arrange the plurality of software-related updates for approval or rejection by the one or more agents based on a priority order.

* * * * *